(12) United States Patent
Gilg et al.

(10) Patent No.: US 9,674,365 B2
(45) Date of Patent: *Jun. 6, 2017

(54) METHOD FOR CARRYING OUT AN AUDIO CONFERENCE, AUDIO CONFERENCE DEVICE, AND METHOD FOR SWITCHING BETWEEN ENCODERS

(71) Applicant: Unify GmbH & Co. KG, Munich (DE)

(72) Inventors: Virginie Gilg, Munich (DE); Tobias Kleemann, Munich (DE); Jorg Krumbock, Berlin (DE); Walter Schmid, Munich (DE)

(73) Assignee: Unify GmbH & Co. KG, Munchen (DE)

( * ) Notice: Subject to any disclaimer, the term of this patent is extended or adjusted under 35 U.S.C. 154(b) by 240 days.

This patent is subject to a terminal disclaimer.

(21) Appl. No.: 14/504,795

(22) Filed: Oct. 2, 2014

(65) Prior Publication Data

US 2015/0016597 A1    Jan. 15, 2015

Related U.S. Application Data

(60) Continuation of application No. 14/078,869, filed on Nov. 13, 2013, which is a division of application No. (Continued)

(51) Int. Cl.
*H04M 3/56* (2006.01)
*H04L 29/06* (2006.01)
(Continued)

(52) U.S. Cl.
CPC ........... *H04M 3/568* (2013.01); *G10L 19/008* (2013.01); *H04L 65/403* (2013.01); *H04M 3/51* (2013.01); *H04M 3/56* (2013.01)

(58) Field of Classification Search
CPC ............ G06Q 10/063114; G06Q 30/02; H04L 29/06027; H04L 63/0428; H04L 65/608;
(Continued)

(56) References Cited

U.S. PATENT DOCUMENTS 5,539,741 A * 7/1996 Barraclough ....... H04L 12/1813
                                                       348/14.07
2002/0181686 A1 12/2002 Howard et al.
(Continued)

FOREIGN PATENT DOCUMENTS

| WO | 02091641 A2 | 11/2002 |
| WO | 02091724 A1 | 11/2002 |
| WO | 03103263 A1 | 12/2003 |

OTHER PUBLICATIONS

R. Venkatesha Prasad; Joy Kuri; H.S. Jamadagni; Dagale; "Automatic Addition and Deletion of Clients in VoIP Conferencing"; 2001 IEEE; 1530-1346/01; pp. 386-391 Tunesien; IEEE; Others; 2001; US.

*Primary Examiner* — Andrew C Flanders
*Assistant Examiner* — Alexander Eljaiek
(74) *Attorney, Agent, or Firm* — Buchanan Ingersoll & Rooney PC

(57) ABSTRACT

A method and an audio conference device for carrying out an audio conference are disclosed, whereby classification information associated with a respective audio date flow is recorded for supplied audio data flows. According to a result of an evaluation of the classification information, the audio data flows are associated with at least three groups which are homogeneous with regard to the results. The individual audio data flows are processed uniformly in each group in terms of the signals thereof, and said audio data flows processed in this way are superimposed in order to form audio conference data flows to be transmitted to the communication terminals.

17 Claims, 12 Drawing Sheets

Related U.S. Application Data

12/309,719, filed as application No. PCT/EP2006/007495 on Jul. 28, 2006, now Pat. No. 8,885,804.

(51) Int. Cl.
*G10L 19/008* (2013.01)
*H04M 3/51* (2006.01)

(58) Field of Classification Search
CPC .. H04L 65/1069; H04L 67/24; H04M 1/2535; H04M 3/38; H04M 3/436; H04M 3/56; H04M 3/567–3/568; H04M 3/42374; H04M 7/006; H04N 7/15; H04N 21/4788
USPC .... 370/259–261, 263, 265–269; 379/202.01; 700/94; 709/204
See application file for complete search history.

(56) References Cited

U.S. PATENT DOCUMENTS

| | | | |
|---|---|---|---|
| 2003/0223562 A1* | 12/2003 | Cui | H04L 12/1813 379/202.01 |
| 2004/0008635 A1* | 1/2004 | Nelson | H04N 7/152 370/260 |
| 2005/0249364 A1* | 11/2005 | Makino | G11B 27/038 381/119 |
| 2007/0223660 A1 | 9/2007 | Dei et al. | |

\* cited by examiner

METHOD FOR CARRYING OUT AN AUDIO CONFERENCE, AUDIO CONFERENCE DEVICE, AND METHOD FOR SWITCHING BETWEEN ENCODERS

CROSS REFERENCE TO RELATED APPLICATIONS

This application is a continuation patent application of U.S. patent application Ser. No. 14/078,869 and is also a continuation patent application of U.S. patent application Ser. No. 12/309,719, which is the US National Stage of International Application No. PCT/EP2006/007495 filed Jul. 28, 2006.

FIELD OF INVENTION

The invention relates to a method for carrying out an audio conference, an audio conference device and a method for switching between encoders.

BACKGROUND OF INVENTION

Speech conference systems allow a number of speech terminals to be connected together into a telephone conference, so that a mixed conference signal which is picked up via respective microphones of the speech terminals of the other participants is fed as a mixed conference signal to the respective participant for audio output. The mixed conference signal intended for a participant for output,— also referred to below as the mixed signal—is in such cases predominantly a superimposition of all audio signals present, however frequently without the audio signal of the participant, since the latter does not need to hear his own contributions to the conference and in fact should not usually do so, since this would actually cause a type of undesired echo effect of what he is saying which the participant could find disturbing. Thus a specific mixed signal is frequently formed for each of the N participants of a telephone conference in which the (N−1) voice signals of the other participants of the telephone conference are processed into the specific mixed signal. This can prove expensive in terms of computing power for the audio conferencing system and entail difficulties in understanding speech for participants involved in the telephone conference since the respective mixed signal for example can also include audio signals with background noises, with the background noises of a number of audio signals being able to be superimposed so that they are clearly perceptible and adversely effect the comprehensibility of the useful audio signals—i.e. the sentences spoken by one of the participants.

To reduce the computing outlay and the background noises it can be useful, especially with telephone conferences with a comparatively large number of participants, not to superimpose all (N−1) speech signals of the N participants, but merely a subset of these N participants and in particular especially a subset of M—with M<N—actively-speaking participants. The audio signals of the other, largely inactive, participants can be ignored in the creation of the mixed signal, so that only the M actively-speaking audio signals are superimposed. This method of operation is based on the assumption that in a well-organized teleconference led by a moderator only a few participants are speaking at the same time and usually speak chronologically after one another.

This type of method for a packet-switched communication system in which an audio energy is determined for each conference participant, on the basis of which a number M of conference participants are included in a mixed signal and the remaining conference participants are not included in the mixed signal is known, from the publication "Automatic Addition and Deletion of clients in VoIP Conferencing", IEEE Symposium on Computers and Communications, Hammamet, Tunesia, Jul. 2001 by Prasad, Kuri, Jamadagni, Dagale, Ravindranath. The particular characteristic of the method is that for each conference participant the mixed signal is formed individually at a terminal of the respective conference participant and each conference participant can adapt the volumes of the mixed M signals themselves via a user interface. However this demands a high transmission bandwidth. Furthermore the publication mentions an upper limit of M=4.

If now—as with the method mentioned in the last section—the set of active and inactive participants is formed dynamically and adapted over the course of time in accordance with audio signals present in the audio conference system to the current and changing activity circumstances, this results is disadvantages in the audio quality of the mixed signal on removal of previously active and now inactive audio signal from the mixed signal or during insertion of a previously inactive and now active audio signal into the mixed signal. For example an abrupt appearance and/or an abrupt disappearance of background noises can occur where an audio signal of a participant features such background noises and this audio signal is determined for a period as active and for another period as an inactive participant. In addition a crosstalk effect and a truncation of crosstalk audio signals can occur in the form of so-called speech clipping, which can be produced as a result of an incorrect composition of the audio signal viewed as active.

SUMMARY OF INVENTION

In addition the speech quality can suffer if channels of an audio conferencing system are dynamically created, the different input signals dynamically mixed and connected to dynamically changing destination participants, so that a state-prone method for encoding of mixed signals to be transmitted for example during switchover from an original encoder to a further encoder can lead to encoding errors or during decoding at a participant device to decoding errors. For example this can occur if a previously inactive participant becomes an active participant and for this participant a new individual encoder and conference channel is instantiated and an individual mixed signal is formed for this participant by means of the individual encoder. The result for the participant is thus that the receiving encoded mixed signal is formed after a point in time by another encoder based on another composition of the mixed signal. A decoder of a receiving participant terminal will thus receive the encoded mixed signal of the original encoder up to a particular point in time and subsequently the encoded mixed signal of the further encoder. For an interim period this can result in adverse effects on quality in audio output at the participant terminal.

An object of the invention is to specify an improved method and an improved arrangement to make it possible to carry out audio conferences in an optimized manner.

This object is achieved by a method for carrying out an audio conference and an audio conferencing device as well as by a switchover method for switchover between encoders and a further audio conferencing device according to the independent claims.

Advantageous developments and embodiments of the invention are specified in the dependent claims.

To carry out an audio conference in which the audio conference is fed audio data flows from communications devices and for the audio data flows classification information assigned to each audio data flow is detected, the audio data flows are assigned in accordance with a result of an evaluation of the classification information to at least three groups which are homogenous with regard to the resifts. The individual audio data flows are processed uniformly in each group in terms of the signals thereof, and the signal-processed audio data flows are superimposed to form audio conference data flows to be output to the communication terminals.

Audio data flows in this case are especially encoded audio signals for circuit-switched or packet-switched transmission, with the audio signals preferably representing speech signals picked up at the communication devices by means of microphones. The communication devices can involve voice terminals or video or multimedia terminals, with an audio component of the video or multimedia data being viewed as the audio component.

The signal processing and/or the superimposing of the audio data flows can be undertaken directly for the audio data flows present in encoded form or for audio data flows decoded into audio signals. When audio signals are used an audio data flow is decoded by means of a decoder of a CODEC (encoding and encoding). After the signal processing and/or the superimposition of audio signals decoded in this way the audio signals will be converted by means of encoding by a further or by the same CODEC into audio data flows for transmission to the communication terminals.

An evaluation of the classification information is especially to be understood as a comparison with reference values, with one result of the evaluation for example being the information that the classification is below a first reference value but above a second reference value. Furthermore during the evaluation of the classification information the classification information of the audio data flows can be considered separately or can be interrelated. In addition an evaluation of the classification information can be based on different logically connected checking steps. Furthermore the checking steps can be differently weighted so that for example an arrangement into a specific group can be forced by a specific checking criterion of a checking step not being fulfilled.

The assignment into three homogeneous groups in relation to the result is undertaken for example with two reference values such that all audio data flows of which the classification information lies below the first and the second reference value will be assigned to a first group which and all audio data flows of which the classification information lies above the first and the second reference value will be assigned to a second group, and that all audio data flows of which the classification information lies between the first and the second reference value will be assigned to a third group.

The groups are homogenous or conformant such that all audio data flows which are assigned to a group deliver the same comparison or analysis results.

The method is advantageous insofar as the complexity of the signal processing can be reduced since only a few different signals are processed—in accordance with the number of groups. In addition the comprehensibility of the speech on receipt of the superimposed data flow can be improved, since audio data flows regarded as important can be accentuated in the superimposition, for example by changing a volume, a tone level, a phase position or other audio parameters of the respective audio data flows and conversely audio data flows regarded as unimportant can be attenuated or processed in another way.

Preferably, in an advantageous embodiment of the invention, within the framework of the detection of one of the items of classification information for one of the audio data flows at least one variable reflecting a characteristic of the audio data flow can be detected for this purpose. This variable for example represents an audio level, a volume level, an audio energy, and can be determined by means of measurement and/or signal analysis. The variables determined can preferably be compared to reference values by means of simple-to-implement comparison operators, so that the audio data flows can be divided up for example into loud, quiet and completely muted audio data flows.

Preferably such a determination of audio parameters can already be undertaken by a CODEC during decoding of a respective audio data flow since decoding can be undertaken in any event before signal processing and before a superimposition of the different audio data. In this way an existing component of an audio conferencing system—the CODEC—can be used for implementing parts of the method steps of the invention.

A further variable to be used for grouping the audio data flows is for example a speech frequency value, which represents a relationship determined over a period of time between speech activity and speech inactivity. Together with the analysis of a volume level the speech frequency value can be employed for a precise distinction between speakers who are only active once or are rarely active and speakers who are active over long periods—but possibly with short interruptions.

For such analyses it is especially advantageous for not only absolute values which reflect a characteristic of the audio data flows to be evaluated but for the relationship of the variables to each other to also be included in the result of the evaluation. Thus for example a group can be formed from the two most active audio data flows, regardless of whether all audio data flows are now transmitting more quiet speech or more loud speech. This type of classification of the audio data flows can be determined by comparing classification information between the audio data flows, or by dynamic adaptation of the absolute reference values for the comparison with the classification information.

In an advantageous embodiment of the inventive method the uniform group signal processing can comprise a group-specific attenuation or a negative amplification of the audio data flows. Thus a signal level reduction of undesired contributions in the audio conference can be achieved, for example of audio data flows which merely contain background sounds and background noise as audio signals. A grouping for a group-specific attenuation is advantageous in such cases to the extent that human hearing can only perceive significant changes in volume and thus a complex, individually different attenuation may possibly not even be perceived. By contrast the attenuation factor is preferably to be freely configurable or dynamically changeable to enable a flexible reaction to be provided for different influences such as the number of participants in the audio conference.

As well as an attenuation in a similar manner a group-specific amplification of audio data flows is also to be possible, so that the process can be generally referred to as a signal strength correction.

Furthermore—especially with use of stereo output at the communication terminal of the audio conference—the audio data flows can be processed as a uniform group in relation to a phase position of their decoded audio signal, so that audio signals of audio data flows considered as important appear in the middle of a virtually perceivable stereo distribution, whereas audio signals of audio data flows considered as unimportant in their phase position are processed as binaural signals such that their position in a virtually perceivable stereo level is felt by the listening conference participant as if it were arranged on the left or right edge of the virtually perceivable stereo level.

In an advantageous development of the invention the evaluation of the classification information can comprise an assessment of a predeterminable preselection individually assigned to one of the audio data flows so that, depending on the group preselection, the assignment to a preselected group can be forced although for example, with sole evaluation of an audio activity comparison, membership of another group would be produced. For example it frequently transpires in real audio conferences that the participant who initiates the audio conference also assumes the function of a moderator during the course of the audio conference. It might thus be sensible to sort this participant into a preferred group, regardless of whether he or she has made a speech contribution in a time segment of the audio conference or not, since it can frequently be important for the moderator of the audio conference, even if he or she just speaks quietly, to be clearly understood by all participants of the audio conference.

The preselection of the group can for example be undertaken using a graphical user interface for control of the audio conference via which the participants of the conference are assigned different roles. Alternately the roles can also be performed by entries via the speech terminals used in each case. A role is for example "muted", which classifies a participant whose microphone is switched off and is merely listening. Another conceivable role is "exclusive", in which only the audio data flows of the speaker identified as "exclusive" are included in the superimposed mixed signal of the audio conference and the audio data flows of the other participant are completely suppressed by means of attenuation.

Furthermore the audio data flows can be assigned priorities, with the priorities likewise being evaluated for division into groups. Viewed in general terms a number of criteria can be checked during division into groups, with the evaluation results being logically linked to each other. For example on the one hand the audio activity can be observed, together with a group preselection for individual participants and taking into account allocated priorities.

Individual items of the classification information can preferably be determined directly from an audio data flow or its decoding audio signal. Other classification information might be able to be determined by interrogating a configuration, with a configuration being able to be performed statically or dynamically, for example via a browser application controlling the audio conference.

Preferably the detection and the evaluation of the classification information and the division into groups for time intervals can be undertaken for periods of the audio conference, so that the audio data flows while the audio conference is being conducted can be assigned over time to different groups assigned. This enables the division into groups to be adapted to the audio data flows, e.g. in accordance with a currently occurring speech activity, so that on division into active speakers and inactive listeners at the relevant point in time a division largely always corresponding to the actual circumstances is undertaken. In a transmission in voice data packets or in so called frames a time interval can for example correspond to precisely one voice data packet or to a frame—or an integer multiple thereof.

In an advantageous development of the invention the classification information for a time interval can be detected and evaluated by including the evaluation of the classification information of a previous time interval. This allows the situation to be prevented in which a previously active participant is already sorted into a new group the first time that they become inactive although there is a high probability that only a short speech pause is involved. By including the evaluation of the classification information of a previous time interval a type of hysteresis can preferably be achieved in which a transition of a grouping in an active group to a grouping in an inactive group is delayed—after one or more time intervals have elapsed for which an inactivity is detected—can be undertaken. By means of this method of operation it can be ensured that the group membership is not changed too frequently for an audio data flow and a number of group changes over the course of time can be kept small.

In a further advantageous embodiment of the invention, on detection of a changing assignment of one of the audio data flows from an original group in a first time interval to a further group in a second time interval, the audio data flow for a predefined time segment can neither be assigned to the original nor to the further group, but will be handled as an individual audio data flow. If for example an assignment into the original group is characterized by signal processing by means of lower attenuation of the audio data flows and an assignment into the further group is characterized by means of signal processing by means of stronger attenuation of the audio data flow, the result achieved can be that an attenuation changes for individual audio data flows starting from a first low attenuation provided for the original group to the second high attenuation provided for the further group constantly in accordance with a monotonous function and/or in discrete steps over the time segment. The outcome can be that no abrupt, clearly perceptible changes are made in the attenuation curve, but rather a softer transition between the two attenuations is achieved.

Thus for example for a switch of groups an audio data flow can be raised dynamically from e.g. −94 dB (dB decibel) to −15 dB, so that no hard, perceptible transition occurs. This especially enables it to be ensured that background noises of a speaker do not appear suddenly or disappear suddenly. Preferably the amplification or attenuation values can be freely selectable, by means of configuration for example.

Preferably for a rising audio signal edge a switch from a high attenuation to a low attenuation can occur more quickly, so that no useful speech information gets lost. On the other hand it can be advantageous for a falling audio signal edge, on a switch from a low attenuation to a high attenuation, to switch the attenuation factor slowly with intermediate steps in order to ensure a soft fading out of the audio data flows.

In the method in which audio data flows are sorted into groups, it can be advantageous also to evaluate this grouping information for a reduction of the encoding effort for audio conference data flows to be output at the communication terminals. Thus for example precisely the same superimposed audio conference data flow can be transferred to the audio data flows a group of muted audio data flows, since the audio conference data flow can be restricted to the superimposing of active audio data flows.

By contrast it can be sensible to transfer to the audio data flows assigned to a group of active participants an audio conference data flow superimposed for individual audio data flows in which its own speech component is filtered out. Thus a separate CODEC would be necessary for this for each audio data flow for creating the respective audio conference data flow, whereas for the case given above for the transmission of a common audio conference data flows only one CODEC can be used for a number of audio data flows.

Since in—previously mentioned—advantageous developments of the invention the group membership changes dynamically over time, the result is that, to save on CODECs, an audio data flow could be applied to another CODEC if group membership changes. However such a switchover creates—at least with state-dependent CODECs—undesired and/or unnatural sound effects, which greatly reduces the quality of the audio conference data flows.

This problem is addressed in the switchover process, in which between a first encoder and a second encoder for an audio data connection which exists between the first encoder and a decoder, especially to carry out an audio conference with the previously mentioned features, the decoder—especially a communication terminal—is fed encoded audio data by the first encoder—especially an audio conference device. In such cases the first encoder is characterized in that the encoded audio data is created by this encoder using an encoding parameter influenced by an audio data history by means of encoding and/or signal processing from a first audio input signal fed to the first encoder. In addition the encoding parameters of one of the two encoders at a current time segment are formed in each case by a fed audio input signal of the current time segment as well as through the audio input signal of at least one previous time segment. In the switchover method the audio data connection from the first encoder to the second encoder is switched over such that, within the framework of the switchover the encoding parameters of the second encoder are matched to the encoding parameters of the first encoder, and when the match occurs between the encoding parameters the audio connection is switched over to the second encoder.

This is a way of preventing any loss of quality occurring during the switchover from the first encoder to the second encoder, since both encoders have the same encoding parameters influencing the encoding process at the switchover point. Thus the decoder receives encoded audio data through a continuous method in which no discontinuities arise in the signal waveform. Decoding parameters based on previous time segments possibly likewise provided in the decoder thus continue to be valid and can continue to be used by the decoder after the switchover of the encoders. Decoding errors because of the switchover of the encoders can thus be prevented.

The switchover method is especially of advantage for compression CODECs since in many known compression encoding methods, preceding time segments are included for achieving a high compression factor.

Achieving a match between the encoding parameters of the two encoders can alternately be undertaken in a current time segment or in a future time segment, with the switchover process thus being able to extend over a number of time segments.

Advantageously after an encoding parameter match and the switchover to the second encoder have been achieved, resources of the first encoder can be released, since both encoders create the same audio data. The number of encoders used simultaneously in an audio conferencing device can thus be reduced and thereby the overall processing complexity of the audio conferencing device greatly reduced.

In an advantageous embodiment of the switchover method, within the framework of switching over the audio data connection from the first encoder to the second encoder the first audio input signal can be modified such that the second encoder in a future time segment is put into the same state as the first encoder. This is advantageously achieved by, before the actual final switchover of the encoders, an audio input signal fed to the second encoder also being fed to the first encoder. In this way the first audio input signal of the two encoders is identical, so that after a preferably already known number of time segments have elapsed, the encoder parameters synchronize until they become identical at a particular time segment. From this point onwards the switch can now be made to the second encoder and the first encoder can be deactivated and/or released.

In an alternate, advantageous embodiment of the switchover method, within the framework of the switchover of the audio data connection from the first encoder to the second encoder, a state of the second encoder is modified such that the encoder parameters of the first encoder are detected and set as encoder parameters for the second encoder. This process is preferably undertaken at the end of a time segment or between two time segments, so that the switchover to the second encoder can already be made during the following time segment.

So that the switchover process can actually be undertaken without any adverse effects on quality, the first encoder and the second encoder can especially use the same encoding algorithm, with possible configurations of the encoder preferably being the same. In this way, when the switchover takes place, the decoder does not learn anything about the switch between the first and the second encoder and can continue to operate unchanged with its decoding algorithm.

As regards the match with the encoder parameters it should be pointed out that an extensive match is involved in this case in which at least those encoder parameters with the greatest influence on the audio quality are similar and/or identical. A complete match between the encoder parameters in their full scope is absolutely necessitated, provided this does not have any perceptible negative effects on the comprehensibility of the speech.

BRIEF DESCRIPTION OF THE DRAWINGS

Exemplary embodiments of the invention will be explained in greater detail on the basis of a drawing.

The figures show schematic diagrams as follows.

DETAILED DESCRIPTION OF INVENTION

Figure 1:
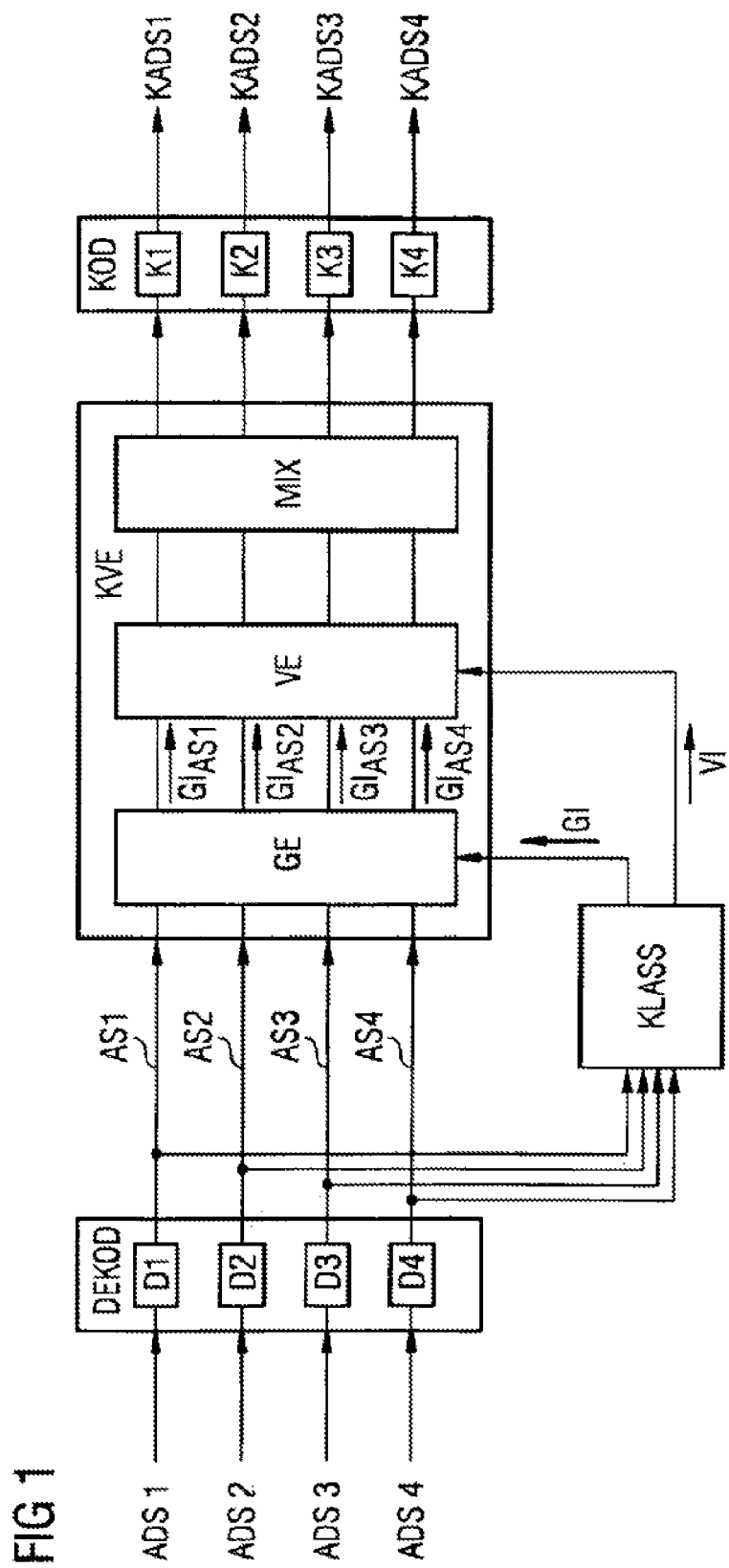
FIG. 1 a block diagram of an audio conference device.

FIG. 1 shows a schematic diagram of an audio conference device. In this device audio data flows ADS1, ADS2, ADS3, ADS4 fed from communication terminals not shown in the diagram are fed to a decoding device DEKOD of the audio conference device. The restriction to four audio data flows in this diagram is merely by way of an example and three dots are used as a symbol to indicate further flows omitted from the diagram. In the decoding device DEKOD the incoming audio data flows ADS1 to ADS4 are converted by means of decoders D1, D2, D3, D4 into decoded audio signals AS1, AS2, AS3, AS4. These audio signals AS1 to AS4 are fed to a conference processing device KVE in which the audio signals AS1 to AS4 are processed, so that audio conference signals to be output are created. These audio conference signals are fed to an encoding device KOD comprising a set of encoders K1, K2, K3, K4 and possibly further encoders. This encoding device KOD encodes the audio conference signals into audio conference data flows KADS1, KADS2, KADS3, KADS4, which are respectively fed to the communications devices. The conference processing device KVE especially comprises three series downstream components which process and analyze the incoming audio signals AS1 to AS4. These are especially a grouping device GE, an amplification device VE as an inventive signal processing unit and a mixing device MIX as a superimposition unit.

The grouping unit GE is provided in this case for forming homogeneous groups of audio data flows and for example features the respective audio signals AS1 to AS4, grouping information $GI_{AS1}$, $GI_{AS2}$, $GI_{AS3}$, $GI_{AS4}$ describing a grouping or impresses such grouping information $GI_{AS1}$ to $GI_{AS4}$ onto the respective audio signals AS1 to AS4, with the grouping information $GI_{AS1}$ to $GI_{AS4}$ being transferred to the amplification unit VE together with the audio signals AS1 to AS4. Furthermore the amplification unit VE is provided for signal processing of the audio data flows ADS1 to ADS4 or their associated audio signals AS1 to AS4 by application of an amplification or attenuation factor. The mixing device MIX is used in such cases for forming superimposed audio signals from the audio signals AS1 to AS4 within the framework of the audio conference. A classification device KLASS as a classification information processing unit is shows as a further component of the audio conference device in FIG. 1, to the inputs of which the audio signals AS1 to AS4 are applied. The classification device KLASS with be examined in greater detail in a later section on the basis of FIG. 2.

The classification device KLASS in this case is intended, by evaluating or analyzing the incoming audio signals AS1 to AS4, to undertake a grouping or classification of the audio signals AS1 to AS4 and thus also of the audio data flows ADS1 to ADS4 into homogeneous groups in respect of an evaluation of classification information, and to make this information available by means of grouping information GI to the grouping unit GE. In addition the classification device KLASS provides the amplification device VE with amplification factor information VI, by means of which the extent—and especially by which factor—the respective audio signal groups are to be amplified or attenuated.

A sequence of the method for executing an audio conference will now be explained further with reference to FIG. 1. In this case N audio data flows, with only the audio data flows ADS1 to ADS4 being considered below, are fed to the audio conference device. It should be noted here that, although all audio data flows ADS1 to ADS4 transmit useful speech information, from the semantic viewpoint only few audio data flows contain an active contribution to the audio conference. It can thus be for example that within the audio conference at one time only one active speaker is present, with all other participants listening and being inactive. It is further to be distinguished that listening participants might still possibly make an audible contribution to the audio conference, because of background noises, which will be transmitted by means of one or more of the audio data flows ADS1 to ADS4 to the audio conference. In addition there can be muted downstream audio conference participants who possibly by means of a statically or dynamically modifiable configuration are to be switched to completely muted although audio signals are being transferred in their respective audio data flows. Also by active muting of a communications device by actuating a muting service feature incoming audio data flows to the audio conference can be made to contain no speech and/or tone information.

The audio data flows ADS1 to ADS4 are now converted in time segments by means of the decoding device DEKOD into the audio signals AS1 to AS4, with the last-mentioned of the conference processing device KVE as well as the classification device KLASS being provided. The classification device KLASS now detects and/or determines for the respective time segment classification information assigned to the respective audio signals AS1 to AS4—and thus similarly also to the assigned audio data flows ADS1 to ADS4. This is especially signal loudness, level a maximum impulse or a signal energy of the respective audio signal AS1 to AS4. An evaluation of the recorded classification information can now by undertaken by the classification unit KLASS such that, on the basis of the signal loudness level, groups of audio signals or audio data flows are formed. In such cases for example a first group of active speakers can be defined in which all simultaneously actively-speaking conference participants are included. Above and beyond this a second group of rarely actively speaking participants can be formed as a further group, for whom primarily background noises are relevant for the respective time segment. In addition a group of muted participants can be formed as the third group who, on the basis of a configuration which also applies as classification information, are set permanently to inactive. With such a classification three homogeneous groups would thus be formed, and these would be a first group of active participants, a second group of inactive participants and a third group of muted participants. The respective groups contain only the respective audio data flows which can be allocated in accordance with the detected classification information to the respective group.

The group membership of the audio signals AS1 to AS4 or of the audio data flows ADS1 to ADS4 is transferred after determination by the classification device KLASS by means of the grouping information GI to the grouping unit GE, so that this can undertake a grouping for the audio signals AS1 to AS4 in accordance with the grouping information GI. In addition the classification information KLASS provides amplification factor information VI of the amplification device VE, with for each group an individual amplification factor value being able to be set for use within the framework of signal processing. For example it can be set for the group of active speakers that no signal processing is to be undertaken by means of an amplification or attenuation and thus the audio signals of this group are to remain unchanged. By contrast a uniform negative amplification across the group can be set for the group of inactive participants—for example a halving of the volume in order to receive more quietly the sound signals to be regarded preponderantly as disruptive noise. For the third group of muted participants a uniform very high attenuation can be defined for the group so that no signals or barely perceptible signals are to be detected in the mixed signal after application of this signal processing.

The amplification device VE now applies preconfigured or dynamically determined group-specific amplification factors for the audio signals AS1 to AS4 based on the grouping information $GI_{AS1}$ to $GI_{AS4}$ transferred by the grouping unit GE and thereby weights the audio signals AS1 to AS4 of the respective groups in accordance with their grouping. This weighting is undertaken individually for the respective audio signals AS1 to AS4 by means of individual signal processing. Afterwards these weighted signal-processed audio signals are processed by means of mixing or superimposition by the mixing device MIX into a number of audio conference signals, which after an encoding by the encoding device KOD are fed as respective audio conference data flows KADS1 to KADS4 to the communication devices of the audio conference.

The advantage of this method of operation is especially that in this way audio conference contributions deemed to be important can be delivered unimpeded or even amplified to the audio conference data flows, whereas audio signals regarded as unimportant can be attenuated or filtered out. This method thus serves for clarity and comprehensibility of the speech of the mixed audio conference signals to the respective receiving communication devices.

As an alternative to the arrangement shown an explicit grouping unit GE can be dispensed with (not shown). In this case can the amplification device VE can evaluate the grouping information GI and the amplification factor information VI jointly and based on this can undertake a group-specific amplification of the audio signals AS1 to AS4. Above and beyond this a grouping unit GE can alternatively be arranged outside the audio path of the audio signals AS1 to AS4 (not shown), since a modification of the audio signals AS1 to AS4 is not absolutely necessary for implementing the invention.

Furthermore, as an alternative to the arrangement shown, a classification device KLASS can also use the audio data flows ADS1 to ADS4 directly as input signals—by contrast with the evaluation of the audio signals AS1 to AS4 explained above. In addition it can be advantageous, on the one hand to provide the audio data flows ADS1 to ADS4 and on the other hand the decoded audio signals AS1 to AS4 jointly to the classification device KLASS, since on the one hand signaling information in the audio data flows ADS1 to ADS4 can be evaluated together with a signal analysis of the audio signals AS1 to AS4.

A classification in the classification device KLASS is undertaken along with an analysis of absolute values, especially by forming relative relationships between the audio signals AS1 to AS4 and/or through global framework conditions which can also be noted.

Forming relationships between the audio signals AS1 to AS4 is understood in this case for example as taking account of relative relationships between the audio signals AS1 to AS4 in which it is especially advantageous that thereby for example, if all audio signals have a low level, a grouping into different groups can still be undertaken—the relatively loudest of the audio signals AS1 to AS4 is for example set in a group of active speakers—whereas with a purely absolute assessment all audio signals may possibly have been assigned to a common group.

The global framework conditions are especially a maximum upper limit of a group set, whereby if more audio data flows were assigned to a group than could be included as group members, one or more of the audio data flows can be assigned to an alternate group.

A more detailed examination of the classification device KLASS is undertaken below with reference to FIG. 2.

Figure 2:
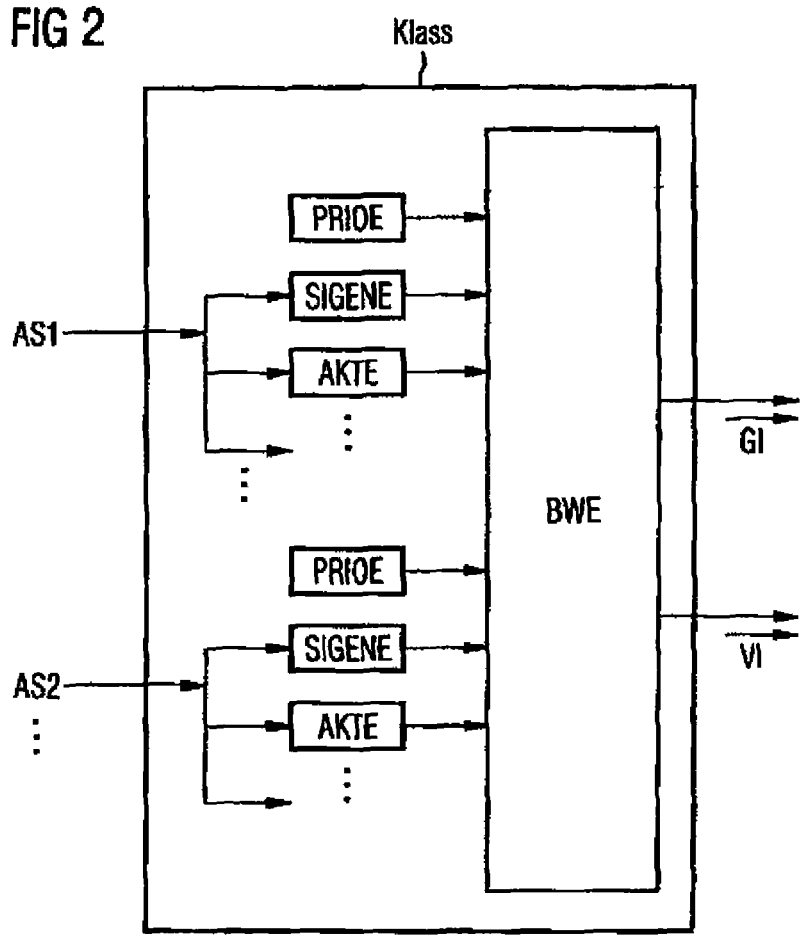
FIG. 2 a block diagram of a classification device contained in the audio conference device, FIG. 3 function curves for three audio data flows over a respective period of time relating to an audio signal of one of the audio data flows, a resulting curve of a group assignment and a curve of an amplification factor, FIGS. 4-7 function curves for an audio data flow over a period of time of a grouping assignment and of a curve of an amplification factor, and FIGS. 8-12 block diagrams for illustrating various method states of an implementation of the switchover method within the framework of an audio conference.

Analysis device components of the classification device KLASS are depicted schematically in FIG. 2. Inputs of the classification device KLASS are once again the audio signals AS1, AS2 and further audio signals not depicted—for example AS3 and AS4. Different analysis device components are called for a respective audio signal AS1, AS2, . . . . These are especially a signal energy determination unit SIGNE and an activity determination unit AKTE, which are provided for each audio signal. FIG. 2 further shows a priority determination unit PRIO for each audio signal, which assigned to each audio signal AS1 or AS2 takes note of a group preselection or a predetermined priority of the audio signal. Further components analyzing the respective audio signal are indicated by three dots below the components PRICE, SIGENE and AKTE to indicate components omitted from the diagram.

The results of the respective analysis devices are fed jointly for all audio signals AS1, AS2, . . . to an evaluation device BWE as the evaluation unit. This evaluation device BWE now determines based on the supplied information of the analysis devices regarding priorities, regarding the respective signal energy and regarding the respective audio activity, the group at a specific time segment to which an assigned signal belongs. The result can be that for example the audio signal AS1 in accordance with an evaluation by the evaluation device BWE is assigned to a group of the active speakers, whereas the audio signal AS2 is assigned to a group of inactive participants. The analysis is undertaken anew for each time segment, with possible analysis results of preceding time segments also being included for a current time segment.

The information regarding the group membership is now transferred by the evaluation device BWE by means of the grouping information GI to the grouping unit GE not shown in FIG. 2. Over and above this the evaluation device BWE transfers group-specific amplification factor information VI to the amplification device VE not shown in the figure. The amplification factor information VI is on the one hand influenced by the group membership, on the other hand by the number of audio signals present at the classification device KLASS. It can thus make sense, depending on the number of conference participants, to provide different amplification factors, depending on how many conference participants are taking part in the audio conference. For example with a small conference there can simply be a division into two different amplification factors—an amplification of 0 DB for all active and less active participants of the audio conference and a total muting by means of setting an amplification of −94 DB for completely inactive or muted participants. With a larger number of participants of an audio conference it might on the other hand be sensible to undertake a more granular division of amplification. In this case for example active speakers can continue to be processed unattenuated—with 0 DB amplification—whereas quiet speakers who are acting in the background, experience a halving of their volume for example and inactive participants, who are merely partly active, will be processed by a four-times attenuation.

A number of groups can be configured or can be predetermined for the conference. Two possible embodiments will be mentioned below as examples. Here a categorization into three groups is undertaken in a first embodiment. The first group comprises active speakers of the audio conference, the second group background speakers and the third group muted or inactive participants of the audio conference The distinction between active speakers and background speakers can in this case for example be undertaken in accordance with a predetermined priority but also by signal processing of the volume or of the signal energy for one or more time segments. A second possible embodiment is for example a division into a first active speaker as a first group, a second active speaker as a second group, further active speakers as a third group, background speakers as a fourth group and inactive or muted participants as a fifth group. With this type of granular grouping, switches between the groups may be able to be undertaken without perceptible changes in the audio conference data flow, because as a result of the high granularity a graduation of the amplification factors can be undertaken merely by means of small changes.

A change between groups can be undertaken for an audio data flow for each time segment which will be considered. In this case however a hysteresis can be additionally noted, through which a switch from a group to another is undertaken possibly with a delay, in that a check is made as to whether the grouping into a further group has taken place over a number of time segments. The group preselection mentioned is for example a permanent assignment of an audio moderator in a group of active participants, so that the moderator can participate at full volume in the speech conference at any time. A prioritization of participants can for example be undertaken by means of configuration at a communication terminal or a data terminal—especially via an application controlling the audio conference on a workstation computer. Preferably for control of a conference a web page in a browser can be provided, by means of which the individual participants can be allocated roles. For example individual participants can be assigned a permanent inactivity, so that these people can only participate in the conference as listeners. Such an allocation of priorities can possibly also be changed dynamically by the moderator during the course of conducting the audio conference.

A signal processing by means of attenuation or negative amplification of group members especially has the advantage that the participants who make an active contribution to the speech conference remain clearly perceptible while other participants who merely produce disturbance noises can be slightly or possibly even heavily attenuated. Since the connection and disconnection of participants with background noises would however have an unpleasant effect for the listening conference participants, since background noises would occur or disappear again from one moment to the next, it makes sense, for a switch from activity to complete inactivity, to let a participant pass in stages through a number of groups, with the respective groups being characterized by different attenuation factors. Thus a participant can move from time segment to time segment, from a group which is unattenuated step-by-step via a slightly attenuated group to a very heavily attenuated group. For the conference participants, after mixing this produces a mixed audio conference signal in which the background noise of one of the participants is slowly faded out.

If on the other hand a participant who was already muted should suddenly become active, the transition to an active group must be completed relatively quickly, since otherwise useful speech information of this participant would be lost. Such a behavior can for example be undertaken by evaluating a filtered signal energy of the respective audio data flow—not shown in FIG. 2—by the filter and/or smoothing being performed by a first-order HR filter (FIR: Finite Impulse Responder) with different filtering coefficients for the rise or fall or a signal edge. A comparison of the filtered audio signal with reference values can thus deliver a grouping into different groups. Only if the filtered audio signal has fallen below a specific threshold value—with this if possible occurring as a result of the filtering only in one of the following time segments—an audio signal is sorted back into a group which describes the inactivity of the participants.

Thus FIG. 2 could be expanded such that, based on the audio energy and the audio activity, a smoothed and/or filtered audio energy will be determined by a further component and on the basis thereof the classification information will be determined.

Different signal curves of audio input signals and classification information are now shown in the following figures.

Figure 3:
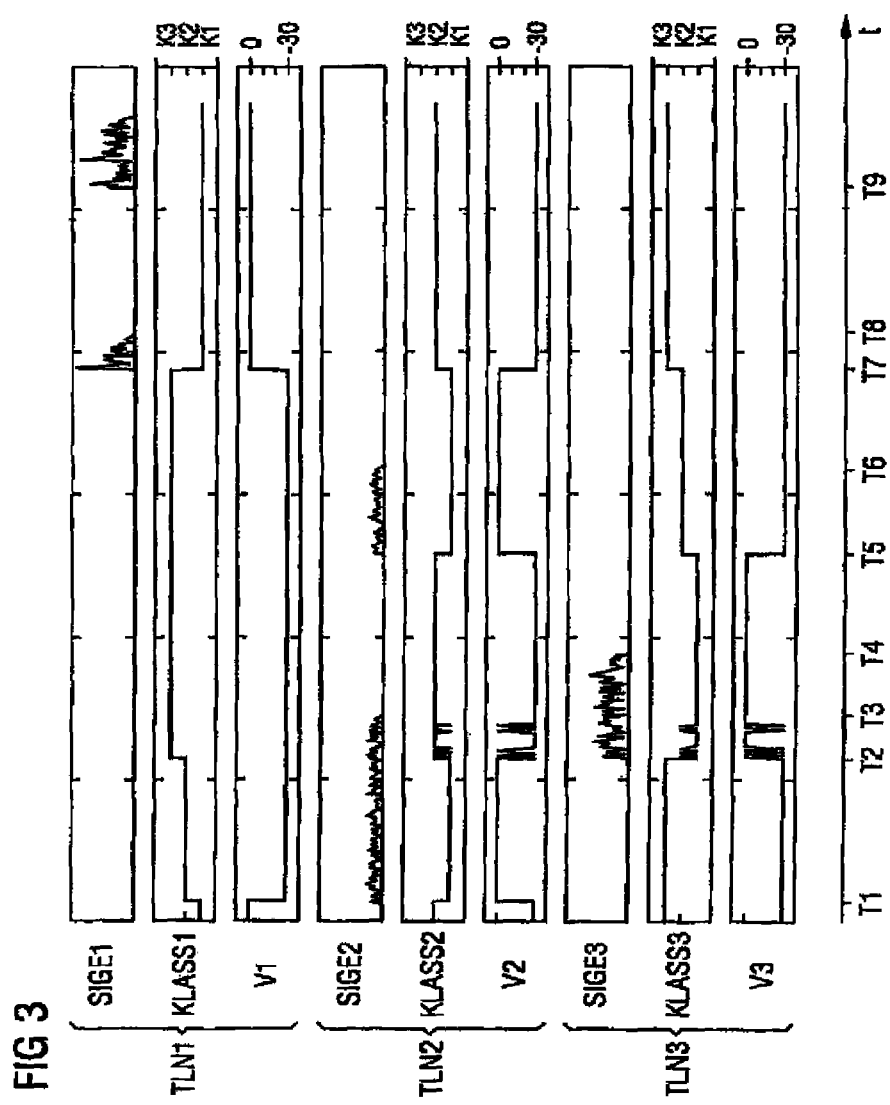

FIG. 3 is a schematic curve of functional sequences plotted on a time axis for three participants TLN1, TLN2, TLN3 of an audio conference. Typically specified for each participant TLN1, TLN2, TLN3 a curve of the signal energy SIGE1, SIGE2, SIGE3, a function with classification information KLASS1, KLASS2, KLASS3 as well as a function about the audio signal amplification set V1, V2, V3.

The curve of a signal energy SIGE1 determined from an audio data flow of the first participant TLN1 is characterized in that, at a point in time T7 no signals occur, whereas between the points in time T7 and T8 a signal energy which is other than zero occurs. Between the point in time T8 and T9 the audio data flow of the first participant TLN1 once more contains no speech information, so that the signal energy SIGE1 in this period is again zero. By contrast, at point in time T9, the first participant TLN1 becomes active again, which has the effect of producing amplitudes of the signal energy curve SIGE1.

The participant TLN2 is characterized by extensive inactivity on their audio data flow, so that the curve of the signal energy SIGE2 is largely zero. Merely in the time segments T1 to T3 as well as T5 to T6 does the curve of the signal energy SIGE2 possess small peaks with low amplitude. This can for example be achieved by quiet speech transmitted by means of the audio data flow or by occurrence of background noises.

The participant TLN3 is permanently inactive with the exception of the time segment T2 to T4 and has a signal energy SIGE3 of zero. Merely in the time segment T2 to T4 does the third participant TLN3 participate in the audio conference, which is indicated in the signal waveform of the signal energy SIGE3 by peaks of the curve.

For FIG. 3 let it be assumed that the audio conference device is configured such that only two classifications of amplification factors are provided. These are an amplification factor of 0 DB for an active speaker and an amplification factor of −30 DB for an inactive speaker or background speaker. Let these values in this case merely be by way of example and able to be preferably configured system-wide or individually. A classification is undertaken in this example into three groups K1, K2 and K3. The first group K1 in this case represents an active speaker or a participant of whom it is expected that he has the highest probability of becoming active again. The second group K2 contains a participant who at a time segment is either little active is or was at least active at a previous point in time. The third group K3 represents a completely inactive participant, who by comparison with the other audio conference participants possesses a lower weighting.

Since in the present example only three audio conference participants TLN1, TLN2, TLN3 are participating in the audio conference, the maximum group strength of the first group K1 and of the second group K2 will be set in each case to an individual participant. The result is thus than an active participant who is assigned at a point in time to the first group K1 will possibly be resorted into a second group K2 although he continues to be active provided one of the other conference participants issues a louder speech signal and the effect of this is a higher level of the respective signal energy curve.

Let the initial situation be that all three participants TLN1, TLN2, TLN3 are inactive. In this case let the basic state of the classification be into the three groups K1, K2, K3 such that first participant TLN1 is presorted into the first group K1 whereas the second participant TLN2 is assigned to the second group K2. Let the third participant T3 in the initial situation be assigned to the third group K3. This can for example correspond to a priority defined in advance. In accordance with this grouping the original amplification factor for the audio data flow of the first participant TLN1 is set to 0 dB while the amplification factor for the two further participants TLN2, TLN3 is set to −30 dB.

The classification information corresponds in the present exemplary embodiment to a height of a signal energy, as is entered in curves SIGE1 SIGE2, SIGE3. The detected classification information is related to each other in an evaluation not shown, so that in accordance with the evaluation a division into the groups K1 to K3 can be undertaken.

Since as from point in time T1 through transmission of zero via the audio data flow of the second participant TLN2 different speech signals are present and this is detectable by means of the signal energy curve SIGE2, the second participant TLN2 is assigned to the group K1 since he is the only participant to fulfill the classification information for this group K1, of being over a certain threshold value of signal energy. The first participant TLN1 is then assigned from his previous group K1 into the next group K2—because of a maximum group strength of a participant in group K1. The third participant TLN3 can remain in the group K3.

At point in time T2, in addition to the second participant TLN2 the third participant TLN3 now becomes an active speaker, with his speech signal energy level very largely clearly higher than the signal energy level of the second participant TLN2. When the signal energy curves SIGE2 and SIGE3 are considered it is shown here that the curve of the third participant TLN3 predominantly runs with greater amplitude compared to the curve of the second participant TLN2, with individual peaks of the signal energy curve SIGE2 exceeding the signal energy value of the third participant TLN3. In the sections in which the second participant TLN2 now has the highest signal energy, this participant TLN2 will be assigned to the highest group K1. In this case the active participant TLN3, because of the maximum group strength of one, will be assigned in the second group K2. However if the effect is reversed, so that the third participant TLN3 has a higher signal energy than the signal energy of the second participant TLN2, the third participant TLN3 will be assigned to the first group K1 whereas the second participant TLN2 is allocated to the second group K2. The completely inactive participant TLN1 on the other hand will be sorted into the lowest grouping level K3.

In FIG. 3 the subdivision into time segments for an analysis of the audio data flows or of the signal energy is shown in a very fine granular way, so that the curves of the classification KLASS1, KLASS2, KLASS3 as well as the amplification V1, V2, V3 appear to have a continuous curve, although actually only at discrete points in time is an evaluation in relation to the classification information undertaken, so that also only a time segment by time segment analysis is performed at the discrete points in time.

In accordance with the classification of the participants TLN2 and TLN3 into the groups K1 and K2, the amplification factors are now also set according to the group classification. Thus the amplification factor V2 changes for the second participant TLN2 depending on their grouping between an amplification factor value of 0 DB and an amplification factor value of −30 DB. Analog and reciprocally to the second participant TLN2 the amplification factor 0 DB and −30 DB is also set alternately for the participant TLN3, depending on their inclusion in the groups K1 or K2.

After the speech signal of the second participant TLN2 has ended at point in time T3 only the third participant TLN3 is temporarily actively speaking. Thus the third participant TLN3 is assigned in the highest-priority group K1 whereas the second participant TLN2 is arranged in the next available group K2. The participant TLN1 remains in the group K3, as in the previous time segment.

As from the point in time T4 none of the three conference participants is actively speaking. In the present exemplary embodiment this means that all participants stay in the previously allocated group. For the first participant TLN1 this would be the group K3, for the second participant TLN2 the group K2 and for the third participant TLN3 the group K1. By contrast, in an alternate embodiment not shown, all participants TLN1, TLN2, TLN3 could be assigned to the third group K3 to the inactive participants.

Following the time curve three further time segments occur in FIG. 3, in which a participant becomes an active speaker in each case, whereas the other participants do not speak. In all three cases the reaction produced by the audio conference systems is that the respective actively speaking participant is assigned to the group K1 and the participant previously assigned to the group K1 is sorted into the group K2. A participant already assigned in the group K3 remains in this group and a participant assigned to the group K2, provided he is inactive for speaking, is assigned to the group K3.

FIG. 3 shows the way in which an evaluation or analysis of the classification information is undertaken and how a signal processing of audio data flows can be made dependent thereupon. Because of the small number of participants in the example, the group strength has been set to one group member in each case, with greater group strengths—at least for some of the groups—possibly being sensible in other implementations.

With reference to FIGS. 4 to 7, further temporal function sequences of the classification information and the amplification are now illustrated within the framework of function diagrams. In such cases a presentation of a curve of the audio activity is omitted from these diagrams. FIGS. 4 to 7 also further differ from FIG. 3 in that only the curves for one participant of the audio conference are shown and that the respective time segments occupy a clearly recognizable segment on the time axis t.

In FIGS. 4 to 7 a classification is undertaken into four classes. One class represents the group of active speakers and is labeled ACT. A further group represents the background speakers of an audio conference and is labeled HG. A third group is labeled INACT and represents inactive participants of the speech conference. In addition a fourth group MUTE exists which represents permanently muted participants. Grouping of a participant or their audio data flows into one of the corresponding categories is entered on the y-axis of the classification curve K. The x-axis represents a time axis t, with the classification only being analyzed or evaluated at discrete points in time.

Below the classification information curve K, in a separate diagram, an amplification V is plotted, with the time axis t likewise being plotted on the x-axis of the diagram and the time axis t corresponding to the classification curve K. Amplification factors which are labeled for the FIGS. 4 to 7 as G1, G2, G3 and G4 are plotted as the y-axis. Let amplification factor G1 be an amplification of 0 DB in this case, amplification factor G2 an amplification of −6 DB amplification factor G3 an amplification of −15 DB and amplification factor G4 an amplification of −94 DB, with the negative amplification factor being used again for an attenuation of the audio signals of the conference. These amplification factor values are however merely examples and can be adapted—by system-wide static configuration or conference-individual settings—depending on implementation.

Figure 4:
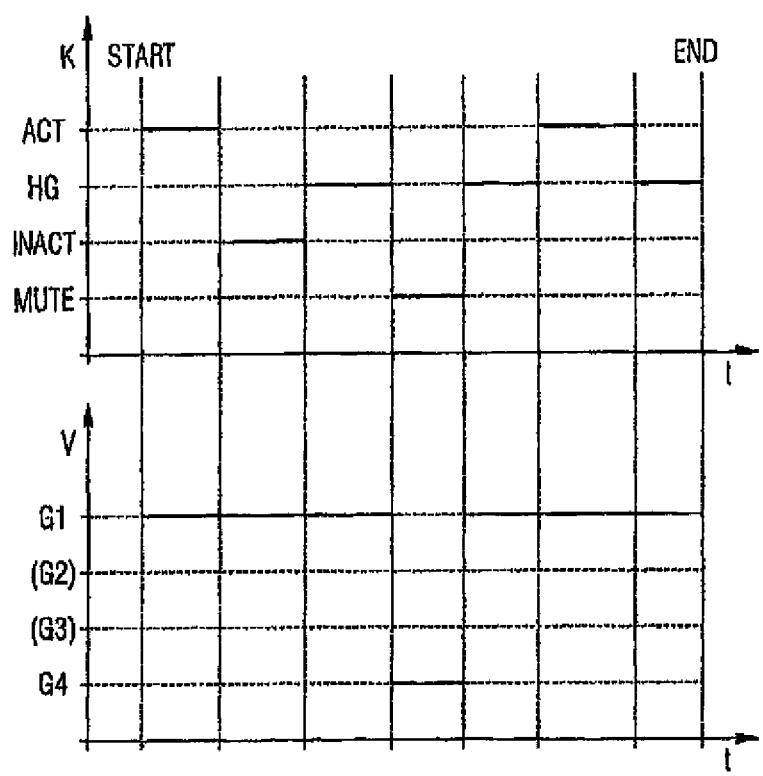

FIG. 4 shows the curve of the classification K and the amplification V of a participant of an audio conference for an audio conference with few participants. Because of the few participants the audio conference device is configured such that only two amplification factors can be set. These are the amplification factors G1 for a grouping into the groups ACT, HG and INACT as well as the amplification factor G4 for a grouping into the groups of the muted participants MUTE.

In the observation period, from time Start up to time End, the observed participant is now assigned to the groups ACT, HG, INACT, MUTE, depending on whether he is actively speaking, especially in relation to a detected speech activity of further conference participants of the audio conference. Thus for example in a first time segment an assignment to the group of active speakers ACT is produced. In a second time segment however an assignment to the group of inactive speakers INACT. Over the course of time the assignment now switches to the groups in accordance with the speech activity of the participants. In addition the observed participant, in a fourth time segment, switches from active to muted which is evident from the assignment to the group MUTE in the classification curve K. This can be done for example by the participant actuating a key for muting the input microphone.

An amplification produced by the classification K which is applied to the audio signal of the participant, is now shown for this time segment in the curve of the amplification V. In this case in accordance with the stated framework conditions for the groupings ACT, HG and INACT, an amplification GI is adopted. Only in the fourth time segment, during which the participant is assigned to the group MUTE will the amplification factor G4 be used through the audio conference device for the present audio data flow. This corresponds in accordance with the value stated here of −94 DB, almost to a muting of the audio data flow. The amplification values G2 and G3 are not included for a conference with few participants, in this present case, because a very granular distinction of the amplification factors does not appear necessary. By contrast a finer splitting up of the amplification factors in FIG. 5 is further explained.

Figure 5:
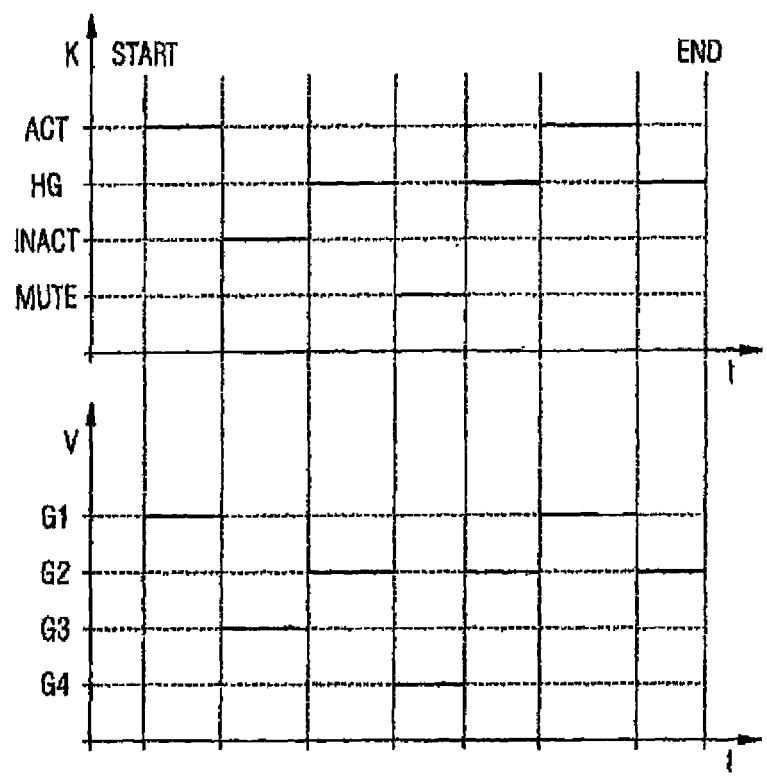

In FIG. 5 each grouping stage ACT, HG, INACT, MUTE is allocated exactly one amplification factor. Thus the amplification factor G1 is assigned for group members of the group ACT. For group members of the group HG the amplification factor G2 is assigned. A corresponding assignment is made for the group INACT and MUTE, to which the factors G3 or G4 are assigned. in this case the curve of the amplification factor V—as can be seen from FIG. 5—coincides exactly with the curve of the classification information K.

Figure 6:
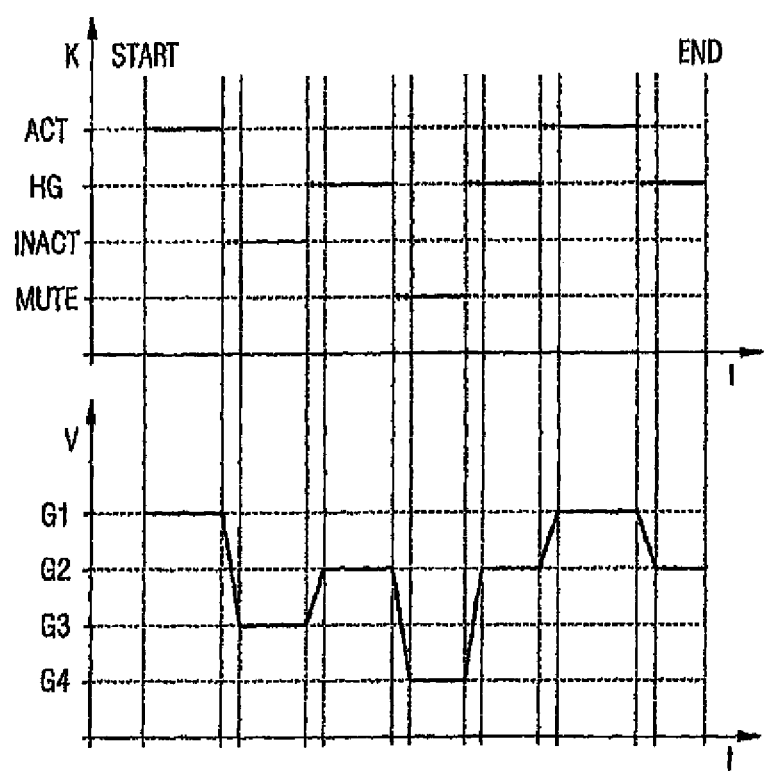
Figure 7:
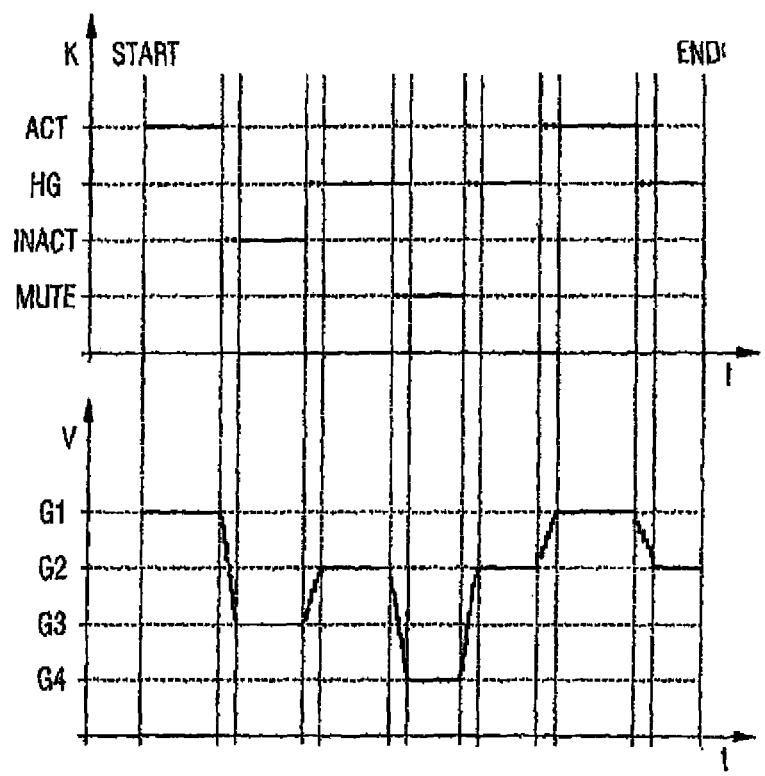

FIGS. 6 and 7 now present further embodiments of the timing curve shown in FIG. 5. In this case it is especially noted that an abrupt change of an amplification factor can possibly have negative effects on the voice quality for the communication user. This is why a softer transition between two amplification factors is explained using FIGS. 6 and 7.

This appears such that, on a switch from a first group to a second group for a short time segment the participant will not be assigned to this group but will be briefly administered without group membership. This is indicated by a dotted line in the curve K. During this time the amplification factor can be varied between a start amplification and a target amplification factor constantly and evenly. Thus a constant curve is produced in the curve V in FIG. 6, with a direct straight connection existing for example between two amplification factor values, with reference to which the amplification factors are varied. This produces a continuous curve of the amplification factors, which has an advantageous effect on the speech quality on the audio conference.

FIG. 7 shows a similar embodiment, but one which differs from that depicted in FIG. 6 however in that during a transition for one amplification factor to another, a variation of the amplification factor in discrete steps is undertaken. The restriction to discrete amplification factor values can reduce the complexity of the amplification matching.

In addition it is possibly advantageous to perform an amplification matching over different time segments, depending on whether a jump between directly adjacent amplification factors is involved—i.e. a switch from −6 DB to −15 DB for a classification of −6, −15, −94 DB—or whether a major change of an amplification factor is involved, i.e. a switch from −6 DB to −94 DB for example. In addition it can be noted whether a change in the direction of an attenuation or in the direction of an amplification is involved, whereby it can be advantageous as regards the audio quality produced to make a change of the amplification factor in the direction of an attenuation more slowly than a change in the direction of a positive amplification. In this way a homogenous speech image can be created and despite this a fast switch on of a speech channel performed if a participant suddenly becomes an active speaker.

The division into homogeneous groups in accordance with a classification is advantageous insofar as the complexity of audio conference device can be reduced by this. This is especially the case if the audio conference data flows to be output to the communication terminals for inactive groups are formed by means of their communication terminals assigned to audio data flows from group-conformant superimposed signal-processed audio data flows, so that for all of the participants assigned to a group an encoding and a superimposition only need to be undertaken once and the results of the encoding and the superimposition can be made available for all participants of the group.

Preferably the classification or grouping and the amplification behavior for the respective groups can be undertaken as a function of the size of the audio conference. It can thus be defined for example by means of preconfigured tables how many groups are to be formed for how many conference participants. This can achieve the result that, for conferences with 3 participants, all participants are to be sorted into one group, for conferences with 4-8 participants three groups are available and for more than 9 participants five groups. Preferably the transition occurs dynamically over the course of time, so that for accepting a further participant into a conference with 8 participants there is a transition from a division into three groups to a division into five groups.

In a similar way also the amplification factor values can also preferably be adapted dynamically as a function of the number of conference participants, so that for a grouping into in three groups for 4-8 participants, different amplification factor values are used for 4-5 participants than for 6-8 participants.

The invention is further especially advantageous in that all participants of an audio conference can merely be sorted into one single group—for example a group of active speakers. In this way the result can preferably be achieved, for conferences with few participants, that all participant audio signals will be mixed, with all audio signals undergoing the same signal processing—or no signal processing. Thus on the one hand compatibility to existing systems and on the other hand a lower complexity for these types of conferences with few participants is produced. In addition—as mentioned above—when a predetermined number of conference participants is exceeded, the number of groups will be increased.

In one embodiment of the invention, a damped and/or smoothed signal energy of one of the audio data flows can preferably be determined as one of the items of classification information by means of filtering of the audio data flow by a filter with a Finite Impulse Responder filter—a so-called FIR filter. For example a lowpass filter applied to the signal energy can achieve a slower behavior as regards the regrouping of the conference participants. As an alternative or in addition for example a first-order FIR filter can be employed, preferably with different, so-called attack and release coefficients, so that a switch into a higher category with smaller attenuation is undertaken more quickly than vice versa, since an FIR filter allows a slow falling off of the signal energy over a number of time segments.

The embodiments explained in accordance with FIGS. 1-7 are especially advantageous in that a volume adaptation or an ongoing signal processing can be performed dynamically, so that the speech comprehensibility for the participants of the audio conference is enhanced. In addition the complexity can be kept low because of the grouping of the audio data flows and the consideration of only a few groups. In addition a processing complexity in an audio conference device can be reduced with reference to the procedure explained in the following figures, since a number of simultaneously used CODECs can be reduced. How a saving in CODECs can be undertaken in such cases will be explained below.

FIGS. 8-12 show schematic block diagrams to illustrate different procedural. states of the switchover method within the framework of an audio conference. The audio conference is typically for five participants with their communication terminals EG1, EG2, EG3, EG4, EG5. Each of the communication terminals EG1, EG2, EG3, EG4, EG5 in this case comprises a decoder D1, D2, D3, D4, D5 for converting received audio data AD1, AD2, AD3, AD4 which is transferred from an encoding device KOD of an audio conference device with its encoders K1, K2, K3, K4. The communication terminals EG1, EG2, EG3, EG4, EG5 are in this case for example speech terminals, such as telephones or telephony applications on a workstation computer, which feature further additional and not shown encoders in each case in order to create audio data from speech signals picked up by means of a microphone and make them available to the audio conference device in packet-oriented or circuit-switched form.

The audio conference device possesses an encoding device not shown in the figure for converting the audio data provided by the communication terminals EG1, EG2, EG3, EG4, EG5 into audio signals AS and a mixing device merely indicated by the "+" sign for mixing or superimposing these audio signals AS. It may also be that a previously-mentioned classification of the communication terminals EG1, EG2, EG3, EG4, EG5 or their audio data or audio signals AS into homogeneous groups depending on the audio activity of the participant is undertaken. Furthermore the audio signals are possibly weighted beforehand or changed by means of signal processing in the signal waveform, for example attenuated or amplified (not shown). Mixed audio signals MIXA, MIXB, MIXC, MIXD are produced as a result of the mixing device which are partly formed specifically for output to one of the communication terminals EG1, EG2, EG3, EG4, EG5 and partly jointly for output to a number of the communication terminals EG1, EG2, EG3, EG4, EG5.

As regards the nomenclature, on the reference symbols "AS" of the audio signals it is indicated by subscripting the labels of the communication terminals EG1, EG2, EG3, EG4, EG5 from which of the communication terminals EG1, EG2, EG3, EG4, EG5 the respective audio signal originates.

A state representing a set of values of encoder parameters of one of the encoders K1, K2, K3, K4 is labeled as ZA, ZB, ZC, ZD, with the currently active state ZA, ZB, ZC, ZD in the FIGS. 8-11 being specified for the respective encoder K1, K2, K3, K4 as a subscripted suffix—e.g. $K1_{ZA}$, $K2_{ZB}$. In this case on the one hand parameters for a synthesis of sounds, but especially also intermediate results of a computation within the framework of an encoding process, are to be understood as an encoding parameter influencing a state.

Encoding parameters are not shown further in the figures and are for example one or more tables of setting parameters for a CODEC. A set of values of all table entries of all encoder parameters incl. the intermediate results of the encoding computation is labeled in the exemplary embodiment here as a state, with a change at least of one table entry or of an intermediate result being designated as a change of state.

A state corresponding to a state of an encoder—i.e. a set of values of encoder parameters—is thus produced for the decoders D1, D2, D3, D4, D5 of the communication terminals EG1, EG2, EG3, EG4, EG5. Here too the state is specified as a subscripted suffix for the decoder reference symbol, with a decoder state corresponding to an encoder being indicated with a dash after the state reference symbol. I.e. the decoder D1, which is connected to the encoder K1, which in its turn has assumed the state ZA and thus is labeled as encoder $K1_{ZA}$, will thus be labeled as decoder $D1_{ZA'}$.

The encoders and decoders are preferably embodied such that they allow analysis values from further back in time to be included in the analysis of a current speech segment. In one embodiment the encoders and decoders use a CELP method (CELP: Code-book Excited Linear Predictive Coding). An example would be a CODEC in accordance with ITU Recommendation G.728 (ITU: International Telecommunication Union).

A state represents for example a stored table of encoding parameters and intermediate results of the encoding computation, which has been produced as a result of an analysis of previous audio signal time segments and is used for an improved encoding/decoding of a current audio signal time segment. A loss of this encoder-parameter and/or intermediate result necessary for the respective CODEC or a non-algorithm-conformant variation of these values would in such cases have a negative and usually perceptible effect on the created audio signals for output to a communication terminal, since these encoder parameters and the intermediate results were introduced precisely for the purpose, while further reducing data to be transmitted, for achieving an at least better speech quality than can be achieved with the same transmission bandwidth without using historical encoder parameters.

In FIGS. 8-12 the connections between encoder and decoder are shown as lines between these components, with a direction of transmission being indicated in the direction of the transmission by arrowheads. These connections can in such cases be based on packet-oriented and/or circuit-switched principles.

Figure 8:
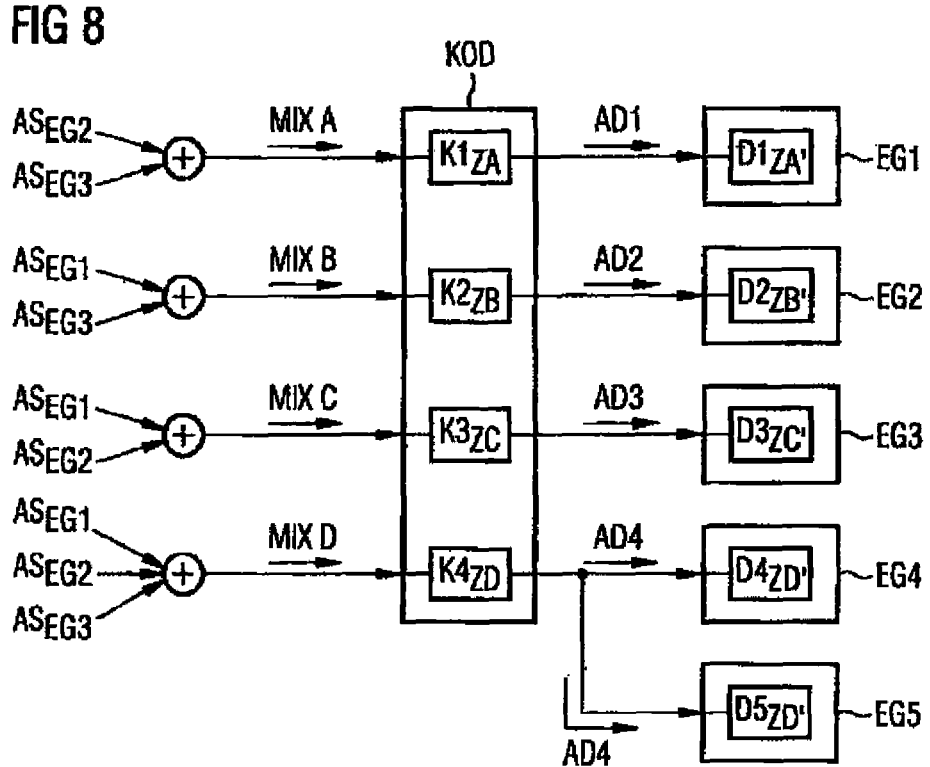

FIG. 8 represents the initial situation for all of the following figures. In an established audio conference between the communication terminals EG1, EG2, EG3, EG4, EG5 let participants of the communication terminals EG1, EG2, EG3 be categorized as active speakers, whereas participants of the communication terminals EG4, EG5 are simply listeners. Let the number 3 by the maximum group strength of the group of active speakers for example for the FIGS. 8-10. Let the group of those simply listening be unlimited. An individually mixed conference signal is formed for the communication terminals EG1, EG2, EG3 of the active speakers in each case in which the speech component of the participant of the communication terminal for which the mixed audio signal is intended is filtered out (not shown). The individual mixed audio signal for the first communication terminal EG1 is MIXA, for the second communication terminal EG2 MIXB and for the third communication terminal EG3 MIXC. The mixed audio signal MIXA in this case is preferably a superimposing of the picked up audio signals provided by the communication terminals EG2 and EG3. The mixed audio signal MIXB is preferably a superimposing of the picked-up audio signals of the communication terminals EG1 and EG3, while the mixed audio signal MIXC is a superimposing of the picked-up audio signals $AS_{EG1}$ and $AS_{EG2}$ of the communication terminals EG1 and EG2 In addition a superimposing of all audio signals of all active participants is formed—i.e. $AS_{EG1}+AS_{EG2}+AS_{EG3}$, provided in this nomenclature a "+" is interpreted as a superimposing operation—with the superimposed mixed audio signal labeled as MIXD.

The mixed audio signal MIXA is fed to the encoder K1, so that this signal, at a specific point in time, has encoder parameters in accordance with state ZA. Similarly a state ZB is produced for the encoder K2 from the application of mixed audio signal MIXB, for the encoder K3 through application of the mixed audio signal MIXC a state ZC and for the encoder K4 through application of the mixed audio signal MIXD a state ZD. The encoder K1, K2, K3, K4 creates the audio data flows AD1, AD2, AD3, AD4 with the numbering corresponding to the encoders K1, K2, K3, K4. The audio data flows AD1, AD2, AD3 are now each individually transferred to the communication terminals EG1, EG2, EG3, whereupon the respective decoders D1, D2, D3 perform a decoding and the respective states ZA, ZB, ZB adopt associated decoding states ZA', ZB', ZC'.

The mixed audio signal MIXD as a superimposition of the audio signals $AS_{EG1}+AS_{EG2}+AS_{EG3}$ is fed to the encoder K4 which subsequently adopts the state ZD representing its encoder parameters. Audio data AD4 generated by the encoder K4 will now be supplied to the two communication terminals EG4 and EG5, with their individual decoders D4 or D5 each adopting the same decoding state ZD'.

Figure 9:
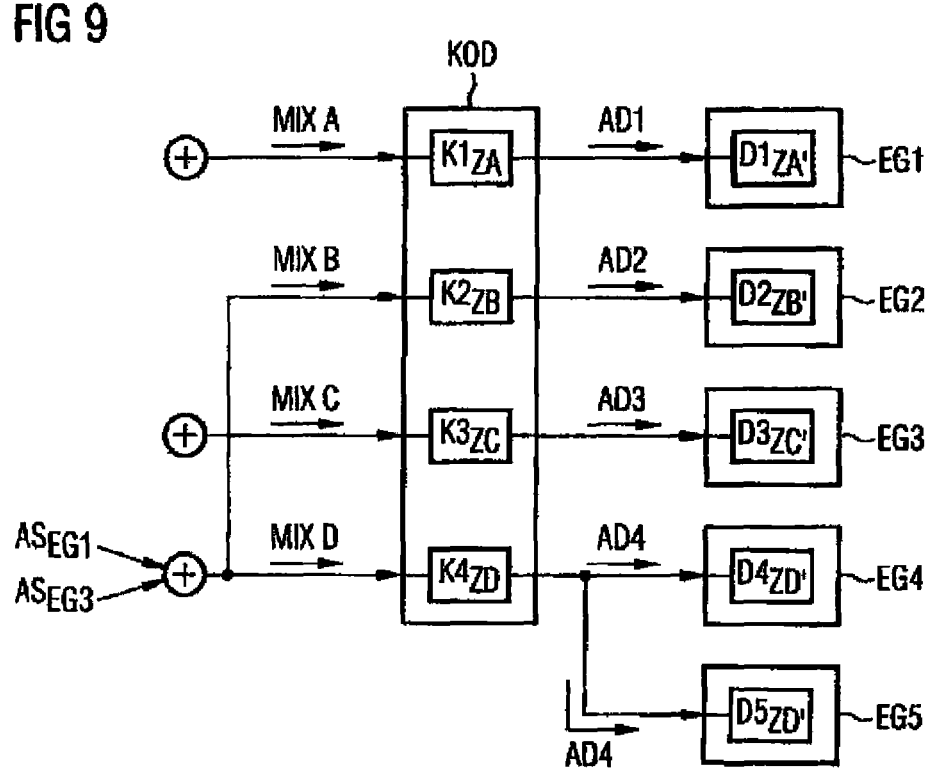

With reference to FIG. 9 starting from the system state shown in FIG. 8, a switch of a speech activity of the participant of the communication terminal EG2 will now be explained below, with the participant of the communication terminal EG2 previously viewed as active being regarded as inactive and being assigned to a corresponding group of inactive participants. There is now the opportunity, as with the merging of the two previously inactive participants of the communication terminal EG4 and EG5 to also supply the new inactive participant of the communication terminal EG2 by jointly created audio data. An abrupt, direct switchover of the decoder input of the decoder D2 to the output of the encoder K4 is however—without application of the switchover method—only possible with degradations in the speech quality, since the encoder K4 with the state ZD has a state differing from state ZB of the encoder K2 and also the state ZB' of the decoder D2 does not correspond to the state of the encoder K4.

By means of an embodiment of the method, the state ZB of the encoder K2 and thus also the state ZB' of the decoder D2 is now changed so that the state ZB approaches the state ZD and the state ZB' the state ZD'. If there is a match between these pairs of states, the output signal of the encoder K4 can be fed to the input of the decoder D2, without perceptible losses in quality occurring.

As shown in FIG. 9, the same mixed audio signal which was fed with the label MIXD to the encoder K4, is likewise fed as from a time segment and for all subsequent time segments to the encoder K2. Furthermore the two encoders K2 and K4, because of their stored encoder parameters which have been produced from the audio signal curves from previous segments, possess differing states ZB and ZD for the time segments. If however it is now assumes that for a CODEC such as the encoders K2 and K4 time segments lying further back have a far smaller influence on the encoder parameters than a current or just elapsed time segment, the result is that the encoder parameters and thus the state ZB of the encoder K2 approach the values of the encoder parameters of the encoder K4, until at a future time segment exact or, taking into account tolerances, if necessary largely matching encoding parameters and thus also a match between the states ZB and ZD of the encoders K2 and K4 arises.

Figure 10:
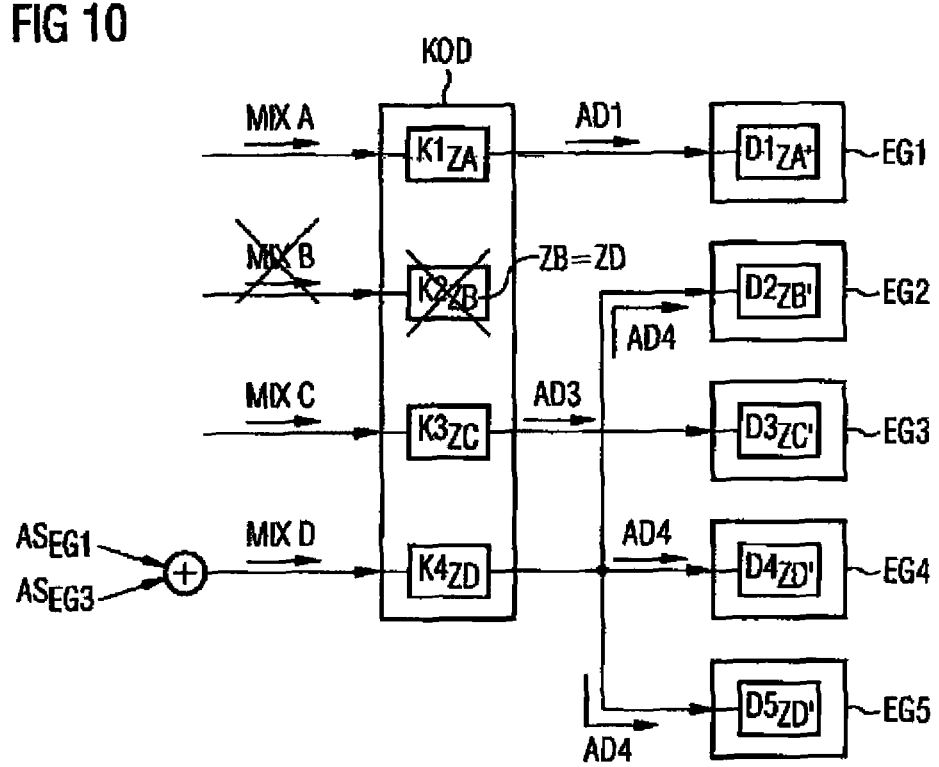

This is fulfilled in the time segment on which FIG. 10 is based. In this time segment state ZB of the encoder K2 has approached the state ZD assumed in the same time segment of encoder K4, so that a switchover of the input of the decoder D2 to the output of the encoder K4 is possible without quality problems. In the current or in a future time segment the audio connection to communication terminal EG2 is now switched over such that a switch is made from encoder K2 as original source of the audio connection to encoder K4. The communication terminal EG2 and thus the decoder D2 thus receives the audio data AD4 fed via the audio data connection, precisely like the communication terminals EG4 and EG5. The state adopted by the decoder D2 also matches the respective state ZD' of the decoders D4 and D5.

In order to save on computing effort and encoder resources in the encoding device KOD, the encoder K2 can now be deactivated, released or removed. Feeding of the mixed signal MIXB can thus likewise be ended. Both are indicated in FIG. 10 by striking through the reference symbols MIXB and K2.

The switchover method explained above is especially advantageous for dynamically assembled encoding devices, in which encoders are dynamically allocated to the audio signals of the audio conference and thus can also be dynamically released again. In this way it may be possible to save on one encoder by switchover to an alternate encoder. Saving on or deactivating an encoder is however advantageous in as much as the processing effort in the encoding device can be reduced in this way, especially for use of complex CODECs which make high demands on computing power.

Figure 11:
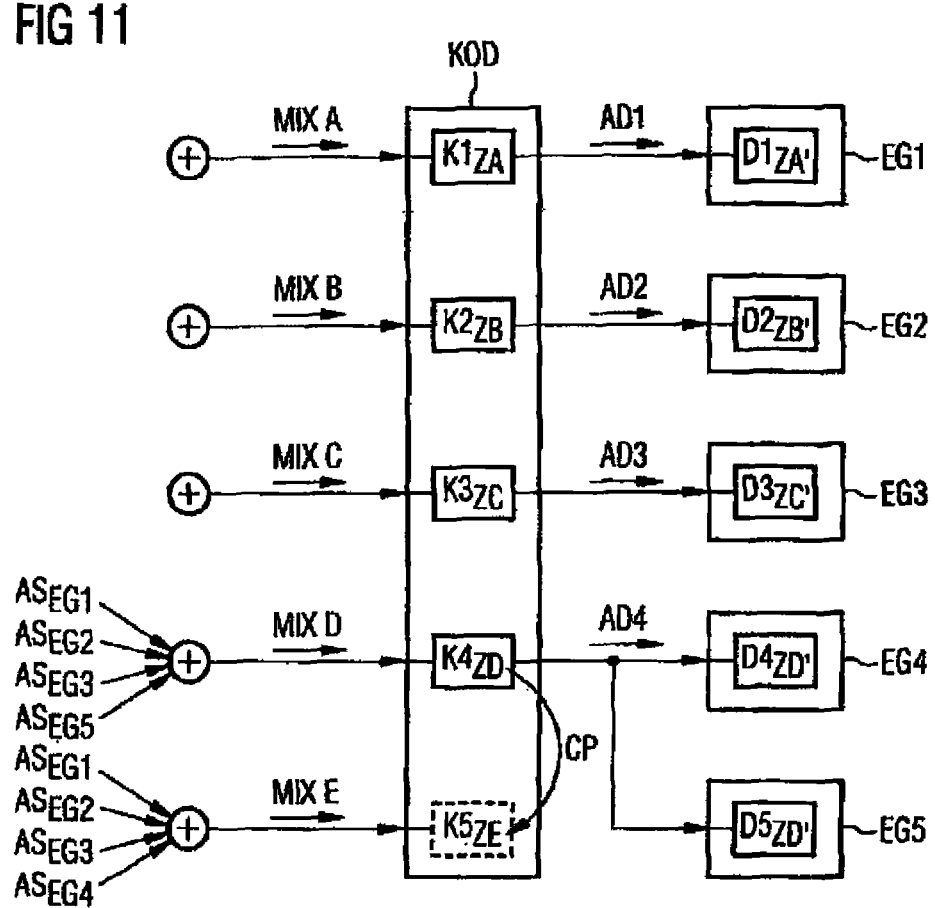

FIG. 11 illustrates a further embodiment of the switchover method starting from the procedural state adopted in FIG. 8. Let the maximum group strength of the group of active speakers be 4 for example. Let the group of those just listening be unlimited. In this case the participant of the communication terminal EG5 becomes active and therefore needs the generation of a specific mixed audio signal, in which all audio components of the other communication terminals EG1, EG2, EG3, EG4 are superimposed. Thus in the encoding device KOD a new encoder K5, provided specifically for an audio connection to communication terminal EG5 is generated or activated, to which a mixed signal MIXE with a superimposition of the audio signals $AS_{EG1}+AS_{EG2}+AS_{EG3}+AS_{EG4}$ is fed. As a result of the new creation of the encoder K5—and thereby also of a new state ZE—by contrast with the encoders K1 to K4 shown as solid rectangles, this is shown as a dashed-line rectangle in FIG. 11.

If now only the encoder K5 were created, without its encoder parameters and thus its state being adapted, a discontinuity of its decoder parameters would be produced for decoder D5 which would have the effect of reducing the speech quality or producing decoding errors. In order to avoid this, the method described below results in the state of the decoder D5 and thus of its decoding parameters continuing to be continuously changed although the audio connection in progress at decoder D5 from encoder K4 to encoder K5 is abruptly switched over.

This is achieved by, after the mixed signal MIXE and the encoder K5 have been created, the encoder parameters and thus the state ZD of the encoder K4 being detected and placed in the same time segment for the encoder K5. This is preferably done by means of a copying process CP—indicated in FIG. 11 by an arrow from encoder K4 to encoder K5. Encoder K5 thus assumes the state ZD without delay and encodes on the basis of this state the incoming mixed signal MIXE. Although this means that the encoding process of the encoder K5 begins suddenly, this discontinuous behavior is not perceived at the decoder D5 of the communication terminal D5, provided a switchover of the audio connection is likewise performed in the same time segment, so that the audio data AD5 generated by encoder K5 is fed to the decoder D5. This is now shown in FIG. 12. The decoder D5 has the state ZD' at the switchover point of the audio connection. Since this corresponds to the state ZD of the encoders K4 and K5 the decoding process is thus not disturbed by a switchover from encoder K4 to encoder K5, so that no perceptible errors in the decoding by the decoder D5 occur. Because of the final switchover to K5 and the connection to decoder D5, in FIG. 12 the encoder K5 is now shown as a solid-line rectangle.

Figure 12:
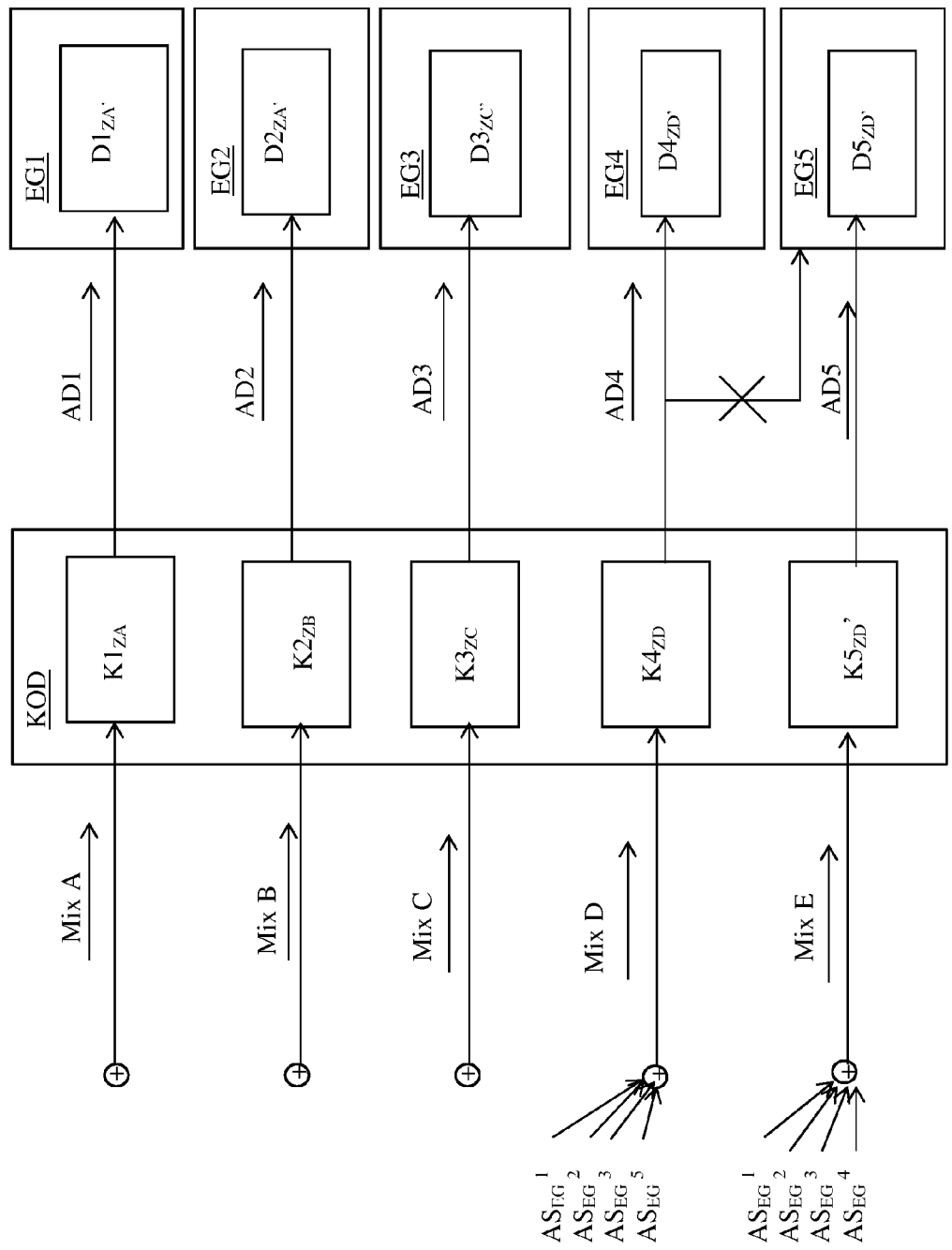

The state ZD of the encoder K5 and the state ZD' of the decoder D5 assumed in FIG. 12 only applies at the switchover point. In the following time segments the encoder K5 can by contrast assume specific states, depending on the mixed signal MIXE. And the decoder D5 will assume the corresponding different states likewise dependent on the state of the decoder D4.

In combination with the process explained with reference to FIGS. 8-12, encoders of an encoding device can be dynamically switched off and switched on, by other encoders taking over the encoding tasks and audio connections being switched between the encoders and decoders of communication terminals.

As well as classical audio conferences a use in other telephone services is also conceivable, in which a number of participants simultaneously sometimes receive the same and sometimes different audio signals, and partly a switch of the audio signals takes place. For example these are announcement services in which a plurality of participants are played a recorded announcement—for example a promotional message—or are played music-on-hold. In this case a number of participants can be temporarily transmitted a common signal via a common encoder, with for example on switching through to a call center agent a participant-specific encoder being activated and the audio connection switched over to this encoder. Thus a reduction in the number of encoders simultaneously active can be achieved for the reproduction of similar-type recorded announcements and tone sequences.

The invention claimed is:

1. An audio conference device comprising:
a classification unit configured to receive audio data flows from terminal devices of audio conference participants, the classification unit configured to evaluate classification information for a first time segment provided in the audio data flows and determine a number of groups to which the audio data flows are to be assigned, the groups comprising at least a first group, a second group, and a third group,
the classification unit configured such that, for each of the audio data flows, the classification unit determines which of the groups that the audio data flow is to be assigned for the first time segment such that the audio data flows assigned to the first group have a homogenous result from the evaluation of the classification information of the first time segment of the audio data flows and the audio data flows assigned to the second group have a homogenous result from the evaluation of the classification information of the first time segment of the audio data flows and the audio data flows assigned to the third group have a homogenous result from the evaluation of the classification information of the first time segment of the audio data flows;
an amplification unit configured to receive amplification information from the classification unit and process the first time segment of the audio data flows such that the received audio data flows in each group are attenuated to a group specific attenuation based upon the amplification information such that the audio data flows assigned to the first group are attenuated differently than the audio data flows assigned to the second group for the first time segment and the audio data flows assigned to the second group are attenuated differently than the audio data flows assigned to the third group for the first time segment and the audio data flows assigned to the third group are attenuated differently than the audio data flows assigned to the first group for the first time segment;
a mixing unit, the mixing unit configured to receive the processed received audio data flows of the first time segment by superimposing or mixing the processed received audio data flows for forming audio conference audio data flows for sending to the terminal devices; and
wherein for each group, the amplification unit is configured to attenuate the audio data flows with group specific attenuation based on a number of total audio data flows within the group.

2. The audio conference device of claim 1, wherein the audio conference device is configured such that processing of the audio data flows assigned to the first group, second group, and third group occurs such that a volume of the audio data flows of the first group is higher than a volume of the audio data flows assigned to the second group and the volume of the audio data flows assigned to the second group is higher than a volume of the audio data flows assigned to the third group.

3. The audio conference device of claim 1, wherein the audio conference device is configured such that processing of the audio data flows assigned to the second group occurs such that these audio data flows are attenuated or amplified such that the volume of the audio data flows assigned to the second group is less than the volume of the audio data flows assigned to the first group.

4. The audio conference device of claim 1, wherein evaluation of the classification information includes an assessment of a predeterminable group preselection identifier individually assigned to one of the audio data flows so that an assignment to a preselected group is forced depending on the group preselection identifier.

5. The audio conference device of claim 1, wherein evaluation of the classification information includes an assessment of the number of audio data flows to be assigned to a group, and wherein an assignment into an alternate group is forced when this number is exceeded in relation to a maximum threshold value of audio data flows assigned to a group.

6. The audio conference device of claim 1, wherein:
the classification unit is comprised of a classification device configured to send group information to a grouping unit of the audio conference device, the grouping unit configured to impress the first time segment of the audio data flows with grouping information based upon the group information received from the classification device;
the classification device also configured to send amplification information to an amplification device of the amplification unit such that the amplification device processes the first time segment of the audio data flows based upon the grouping information impressed by the grouping device, the amplification device configured to apply a first amplification factor for the audio data flows assigned to the first group identified via the amplification information and a second amplification factor for the audio data flows assigned to the second group identified via the amplification information, the first amplification factor differing from the second amplification factor.

7. The audio conference device of claim 1, wherein the classification unit is comprised of a classification device that is configured to send group information and amplification information to an amplification device of the amplification unit such that the amplification device processes the first time segment of the audio data flows based upon the grouping information and the amplification information, the amplification device configured to apply a first amplification factor for the audio data flows assigned to the first group identified via the amplification information and grouping information and a second amplification factor for the audio data flows assigned to the second group identified via the amplification information and grouping information, the first amplification factor differing from the second amplification factor.

8. The audio conference device of claim 1, wherein the groups are also comprised of a fourth group of audio data flows and a fifth group of audio data flows, the audio data flows assigned to the fifth group being muted.

9. The audio conference device of claim 1, wherein the audio data flows of the first group, the second group, and the third group are each attenuated to define a transition between the first group and the second group and to define a transition between the second group and the third group.

10. The audio conference device of claim 1, wherein:
the audio conference device configured to evaluate classification information for a second time segment provided in the audio data flows and, for each of the audio data flows, the audio conference device configured to determine which of the groups that the audio data flow is to be assigned for the second time segment such that the audio data flows assigned to the first group have a homogenous result from the evaluation of the classification information of the second time segment of the audio data flows and the audio data flows assigned to the second group have a homogenous result from the evaluation of the classification information of the second time segment of the audio data flows and the audio data flows assigned to the third group have a homogenous result from the evaluation of the classification information of the second time segment of the audio data flows; and
the audio conference device configured to process the second time segment of the received audio data flows such that the audio data flows assigned to the first group for the second time segment are processed differently than the audio data flows assigned to the second group for the second time segment and the audio data flows assigned to the second group are processed differently than the audio data flows assigned to the third group for the second time segment and the audio data flows assigned to the third group are processed differently than the audio data flows assigned to the first group for the second time segment.

11. The audio conference device of claim 10, wherein one of the audio data flows assigned to the third group for the first time segment is assigned to the first group or the second group for the second time segment based upon an evaluation of a filtered signal energy of that audio data flow.

12. The audio conference device of claim 10, wherein evaluation of the classification information of the audio data flows for the second time segment is carried out with an inclusion of the evaluation of the classification information of the audio data flows from the first time segment.

13. The audio conference device of claim 10, wherein one of the audio data flows assigned to the third group in the first time segment is assigned to the second group or the first group in the second time segment and upon a detection of a changing of group assignment for that audio data flow, an individual attenuation to that audio data flow is provided starting from an attenuation provided for the third group that is changed in accordance with a monotonous function constantly or is changed in accordance with the monotonous function in discrete steps until that data flow is attenuated at a second attenuation of the first group or second group.

14. The audio conference device of claim 1, wherein one of the audio data flows assigned to the third group in the first time segment is assigned to the second group or the first group in the second time segment and wherein a detection of the changed assignment for that audio data flow occurs only after a plurality of time intervals pass in which that audio data flow is assigned to the second group or the first group.

15. The audio conference device of claim 1, wherein the classification information is comprised of signal loudness level of the audio data flows.

16. The audio conference device of claim 1, wherein the first group is associated with active participants of a conference call, the second group is associated with inactive participants of the conference call, and the third group is associated with muted participants of the conference call.

17. The audio conference device of claim 16, wherein the amplification unit is configured such that processing of the audio data flows is performed such that audio data flows assigned to the second group are attenuated to a lower volume level than the audio data flows assigned to the first group.

* * * * *